(12) United States Patent
Alcorn et al.

(10) Patent No.: US 12,187,370 B2
(45) Date of Patent: Jan. 7, 2025

(54) BICYCLE TRANSPORTATION APPARATUS AND METHOD OF USING SAME

(71) Applicant: BikeFlights, LLC, Portland, OR (US)

(72) Inventors: William Alcorn, Portland, OR (US); Kurt Rozek, Beaverton, OR (US)

(73) Assignee: BIKEFLIGHTS, LLC, Portland, OR (US)

( * ) Notice: Subject to any disclaimer, the term of this patent is extended or adjusted under 35 U.S.C. 154(b) by 563 days.

(21) Appl. No.: 17/546,288

(22) Filed: Dec. 9, 2021

(65) Prior Publication Data

US 2023/0182839 A1 Jun. 15, 2023

(51) Int. Cl.
*B62H 3/10* (2006.01)

(52) U.S. Cl.
CPC ...................................... *B62H 3/10* (2013.01)

(58) Field of Classification Search
CPC .................................. B62H 3/04; B62H 3/10
See application file for complete search history.

(56) References Cited

U.S. PATENT DOCUMENTS

| | | | |
|---|---|---|---|
| 2,339,947 A | 1/1944 | Reaume | |
| 2,490,186 A | 12/1949 | Yarman | |
| 5,328,033 A | 7/1994 | Ptaschinski | |
| 5,520,280 A | 5/1996 | Lickton | |
| 5,579,972 A | 12/1996 | Despain | |
| 6,505,719 B2 | 1/2003 | Gonzalez | |
| 7,503,864 B2 | 3/2009 | Nonoshita et al. | |
| 7,874,567 B2 | 1/2011 | Ichida et al. | |
| 8,505,793 B2 | 8/2013 | Foley | |
| 8,820,004 B1 | 9/2014 | Jeffords | |
| 9,022,265 B2 | 5/2015 | Wolfe et al. | |
| 9,381,973 B2 | 7/2016 | Williams | |
| 9,902,333 B2 | 2/2018 | Gray | |
| 10,023,253 B2 * | 7/2018 | McGriskin | B62H 3/00 |
| 10,946,924 B2 | 3/2021 | Priest et al. | |
| 11,970,233 B1 * | 4/2024 | Wirtz | B62H 3/10 |

FOREIGN PATENT DOCUMENTS

| | | |
|---|---|---|
| DE | 102018206760 A1 | 11/2019 |
| DE | 202020104051 U | 7/2020 |
| EP | 3789283 A1 | 3/2021 |
| JP | 2004161020 A * | 6/2004 |
| WO | 2015092348 A1 | 6/2015 |

OTHER PUBLICATIONS

International Search Report for PCT/US2022/052108 dated Apr. 25, 2023.
Written Opinion of the International Searching Authority for PCT/US2022/052108 dated Apr. 25, 2023.

* cited by examiner

*Primary Examiner* — Kevin Hurley

(74) *Attorney, Agent, or Firm* — Buchanan Ingersoll & Rooney PC

(57) ABSTRACT

An adjustable spacer can be positioned to support front or rear bicycle wheel frames for transportation of bicycles. In some embodiments, a first spacer can be used to support a rear wheel hub for the frame and a second spacer can be used to support a front wheel hub for the frame. The spacers can be positioned to provide support to the frame for transportation within a box or other container to help avoid damage to the frame of the bicycle.

14 Claims, 5 Drawing Sheets

BICYCLE TRANSPORTATION APPARATUS AND METHOD OF USING SAME

FIELD

This innovation relates to bicycle transportation devices and methods of using the same.

BACKGROUND

Bicycles such as cycles, bikes, and mountain bikes often include front and rear wheels and are powered by a user's feet using pedals to rotate wheels of the bicycle via a chain. A user can use handlebars of the bicycle to help rotate a front wheel to steer the bicycle as the bicycle is moved via the rotation of the pedals driven by the user's feet.

Some bicycles can include a motor to assist in the driving of the wheels or to power motion of the wheels. Some types of such bicycles can be referred to as e-bikes.

Bicycles can be transported for a user to attend and participate in a race or for another use. In transporting bicycles, they are often placed in a box or bicycle container. The wheels, seat, and handle bars may be decoupled from the frame of the bicycle for transportation of the bicycle. Occasionally, bicycle components can be damaged during transportation. To try and avoid such damage, components are typically wrapped in foam, bubble wrap, or other wrapping for being positioned in the box or container. Some bicycle transportation containers can have rigid outer housings for protecting the bicycle positioned therein as well. Bicycles can also be transported by being placed on a rack.

Examples of bicycles, bicycle components, bicycle containers and bicycle transportation methods can be appreciated from U.S. Pat. Nos. 10,946,924, 9,902,333, 9,381,973, 9,022,265, 8,820,004, 8,505,793, 7,874,567, 7,503,864, 6,505,719, 5,579,972, 5,520,280, 5,328,033, 2,490,186, and 2,339,947.

SUMMARY

Bicycle shipping can result in inadvertent damage of bicycle components. The frame of the bicycle can be damaged due to a box or container being dropped, for example. We determined that at least one spacer can be provided to help support weaker front and wheel axle support portions of a bicycle frame to help avoid such damage from occurring. For example, a front spacer can be positioned between the front forks of a bike frame used to connect and support the front wheel axle to the frame. As another example, a rear spacer can be positioned between spaced apart seat stays or chain stays of a bike frame at which a rear wheel axle can be connected to the bicycle frame to help avoid such damage from occurring. Each spacer can be sized and configured to extend between spaced apart frame elements that have holes for receiving a wheel axle to provide a relatively rigid support for helping to avoid bending or fracture of the frame portions to which the spacer is attached.

The spacer can be configured to be adjustable in size. For instance, an adjustable member can be slid into the body of the spacer to make the spacer shorter or slid out of the body of the spacer to extend the length of the spacer to provide an adjustable sized spacer that can accommodate numerous different bike frame dimensions. As another example, an adjustable member may be moved relative to another member of the space to extend or retract the spacer to provide an adjustable length spacer.

A bicycle transportation apparatus can include a spacer, the spacer having an outer body and an adjustable member that is positionable within an inner passageway of the outer body to different locations so a length of the spacer is adjustable. The spacer can be positionable for attachment to a frame of a bicycle.

In some embodiments, the adjustable member can have a projection and the outer body can have a plurality of grooves positioned adjacent the inner passageway such that each of the grooves are in communication with the inner passageway. The projection can be sized and configured to be matingly received within any of the grooves while a portion of the adjustable member is within the inner passageway. The projection can extend from a second end of the adjustable member to a location that is spaced apart from a first end of the adjustable member to define a terminal end portion of the adjustable member that is sized for insertion into a hole of a bike frame that is sized to retain a portion of a wheel axle for a bicycle wheel (e.g. a front fork hole or a hole in a rear stay of the bike frame, etc.).

In some embodiments, each of the grooves can have a different length to define different positions for the adjustable member for defining different lengths of the spacer. For example, each of the grooves can be sized so that the adjustable member is in a selectable pre-defined position within the outer body when the projection is positioned within an entire length of the groove to define one of a plurality of different lengths of the spacer.

In some embodiments, the outer body can have a first end and a second end and each of the grooves can extend into the outer body from the second end (e.g. extend from the second end to an inner location between the first end of the outer body and the second end of the outer body). The inner passageway of the outer body can extend from the second end of the outer body to the first end of the outer body or to a position that is between the first end of the outer body and the second end of the outer body.

Each of the grooves can have a terminal opening defined in the second end of the outer body. The terminal opening can be in communication with the groove and the inner passageway of the outer body.

One or more indicia can be positioned on the second end of the outer body adjacent to a respective one of the terminal openings of the grooves. For instance, there can at least be an indicia for each respective groove positioned on the second of the outer body adjacent to that groove. The indicia can include words, letters, numbers, or other indicia to indicate the spacer size (e.g. full length of spacer, or length of axel the spacer can replace for bicycle transportation for when the projection of the adjustable member is positioned in the groove and terminal opening associated with that indicia via the position of the indicia near the terminal opening on the second end of the outer body.

The outer body can be comprised of a polymeric material and the adjustable member can also be comprised of a polymeric material. The outer body can be an annular member (e.g. tube-like, hollow polygonal shaped member, hollow member of another shape, etc.). The adjustable member can also be an annular member (e.g. tube-like, hollow polygonal shaped member, hollow member of another shape, etc.).

The bicycle transportation apparatus can also include a bike frame having spaced part front forks. The spacer can be attached between the front forks. In some embodiments, the first end of the outer member can be positionable in a hole of one of the front forks and a first end of the adjustable member can be positionable within a hole of the other of the front forks.

In some embodiments, the bike frame can have spaced part seat stays and/or chain stays and the spacer can be attached between the seat stays and/or chain stays.

In some embodiments, there can be multiple spacers (e.g. a front spacer and a rear spacer). Such embodiments can include a bike frame having spaced apart front forks and spaced apart seat stays and/or chain stays. The front spacer can be attached to the frame between the front forks and the rear spacer can be attached between the seat stays and/or chain stays. In such embodiments, it should be appreciated that the rear spacer and the front spacer can each have an outer body and an adjustable member that is positionable within an inner passageway of the outer body to different locations so a length of the spacer is adjustable from a first length to at least one second length.

The bicycle transportation apparatus can also include other elements. For instance, the apparatus can also include a box. The box can be sized so that a bicycle frame is positionable within the box. The box can be a cardboard box, plastic container having a hinged lid, or other type of container in some embodiments.

As another example, there can be one or more mounting devices positionable on a bottom of the box within the cavity of the box that can retain the bike frame and spacer(s). A bottom of the body of each mounting device can be positionable on the floor of the cavity within the box or be attached to the box and can have an upper portion that defines an upper mounting opening (e.g. groove, furrow, channel, or other type of aperture) to receive and retain the spacer therein for positioning of a bike frame within the box. The upper mounting opening can be sized and shaped to retain the outer body and/or adjustable member of the spacer that is positioned between forks or other portions of a bike frame, for example. In some embodiments, the top portion of the body can define a groove or other opening so the body of the spacer can be positioned on an upper surface or top of the body. In other embodiments, the mounting opening can be a channel that is defined to extend from at least one side of the body that is between the top and bottom sides of the body for receiving the outer body portion of the spacer therein. The adjustable member can then be adjustably positioned within the outer body of the spacer while the outer body is within the channel and extending from a side of the body of the mounting device. In such embodiments, the adjustable member can be positioned outside a first side of the body of the mounting device (e.g. a left side, right side, front side, or rear side of the body positioned between the top and bottom of the body) while an end of the outer body of the spacer is positioned outside a second side of the body opposite the first side (e.g. a left side or right side or a front side or a rear side).

The body of the mounting device can be sized and shaped as an integral body (e.g. molded or otherwise formed from foam or polymeric material to have the base and upper mounting opening).

A bicycle transportation spacer is also provided. The spacer can include an outer body having first end and a second end opposite the first end. The outer body can have an inner passageway that extends inwardly from the second end and can also have a plurality of spaced grooves positioned around the inner passageway. Each of the grooves can be communication with the inner passageway. An adjustable member can be positionable within the inner passageway of the outer body to different locations so a length of the spacer is adjustable between a longest length and a shortest length. The adjustable member can have a projection sized and configured to be matingly received within any of the grooves while a portion of the adjustable member is within the inner passageway.

Each of the grooves can have a different length to define different positions for the adjustable member to define different lengths of the spacer. For instance, each of the grooves can be sized so that the adjustable member is in a selectable pre-defined position within the outer body when the projection is positioned within an entire length of the groove to define a length of the spacer for attachment to a frame of a bicycle.

The inner passageway can extend from the second end of the outer body to the first end of the outer body or to a position that is between the first end of the outer body and the second end of the outer body. Each of the grooves can have a terminal opening defined in the second end of the outer body. The projection can be a spline or other type of projection (e.g. protuberance, tooth, etc.).

The adjustable member can be a tubular member or an annular member in some embodiments. The adjustable member and the outer member can each have a body that is polygonal shaped, rod-like in shape, bar-like in shape, or have a type of elongated shape.

Embodiments of the spacer can also include a mounting device. For instance, the mounting device can include an aperture defined therein for retaining the outer body as discussed above.

A method of transporting a bicycle is also provided. The method can include providing at least one spacer for attachment to a frame of a bicycle. The spacer can have an outer body and an adjustable member that is positionable within an inner passageway of the outer body to different locations so a length of the spacer is adjustable. The method can also include attaching the at least one spacer to the frame and positioning the frame having the at least one spacer attached thereto in a box for shipment of the bicycle.

The method can also include other steps. For example, the method can include adjusting a length of the at least one spacer via movement of the adjustable member to a pre-selected location within the inner passageway before attaching the at least one spacer to the frame. The adjusting of the length of the spacer can include positioning a projection of the adjustable member within a groove of the outer body and sliding the adjustable member within the inner passageway until the projection is within an entire length of the groove. The groove can be in communication with the inner passageway.

As noted above, in some embodiments, the projection can be a spline, the adjustable member can be a tubular member or an annular member, the adjustable member can be comprised of a polymeric material or a metal and the outer body can be comprised of a polymeric material or a metal.

Embodiments of the method can also include use of one or more mounting devices. For example, one or more mounting devices can be positioned in a box and a respective spacer can be positioned within an upper mounting opening of a respective one of the mounting devices (e.g. a front spacer can be positioned in an upper mounting opening of a front mounting device and a rear spacer can be positioned in an upper mounting opening of a rear mounting device). The one or more mounting devices can be positioned in the box to help retain the bike frame within the box for transportation.

Other details, objects, and advantages of a bicycle transportation spacer, bicycle transportation apparatus, and methods of making and using the same will become apparent as the following description of certain exemplary embodiments thereof proceeds.

BRIEF DESCRIPTION OF THE DRAWINGS

Exemplary embodiments of a transportation spacer, bicycle transportation apparatus, and methods of making and using the same are shown in the drawings included herewith. It should be understood that like reference characters used in the drawings may identify like components.

DETAILED DESCRIPTION OF EXEMPLARY EMBODIMENTS

Figure 1:
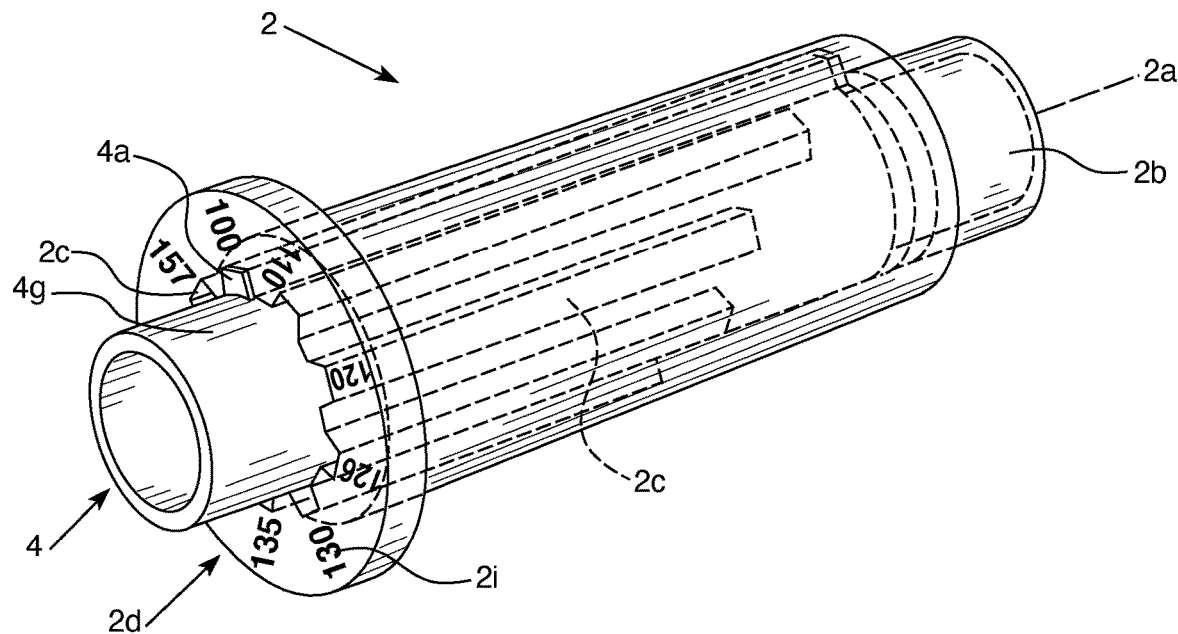
FIG. 1 is a perspective view of a first exemplary embodiment of a bicycle transportation spacer.
Figure 2:
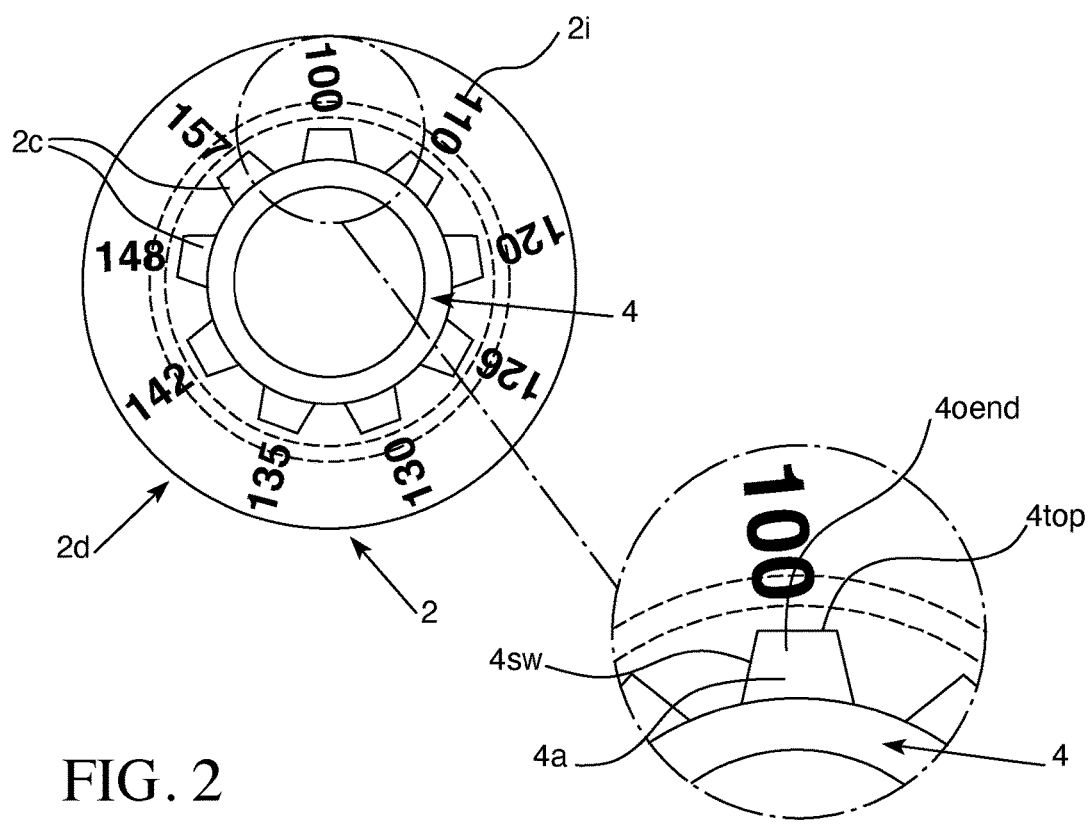
FIG. 2 is an end view of the first exemplary embodiment of the bicycle transportation spacer that also provides an enlarged detailed view of a portion of the spacer.
Figure 3:
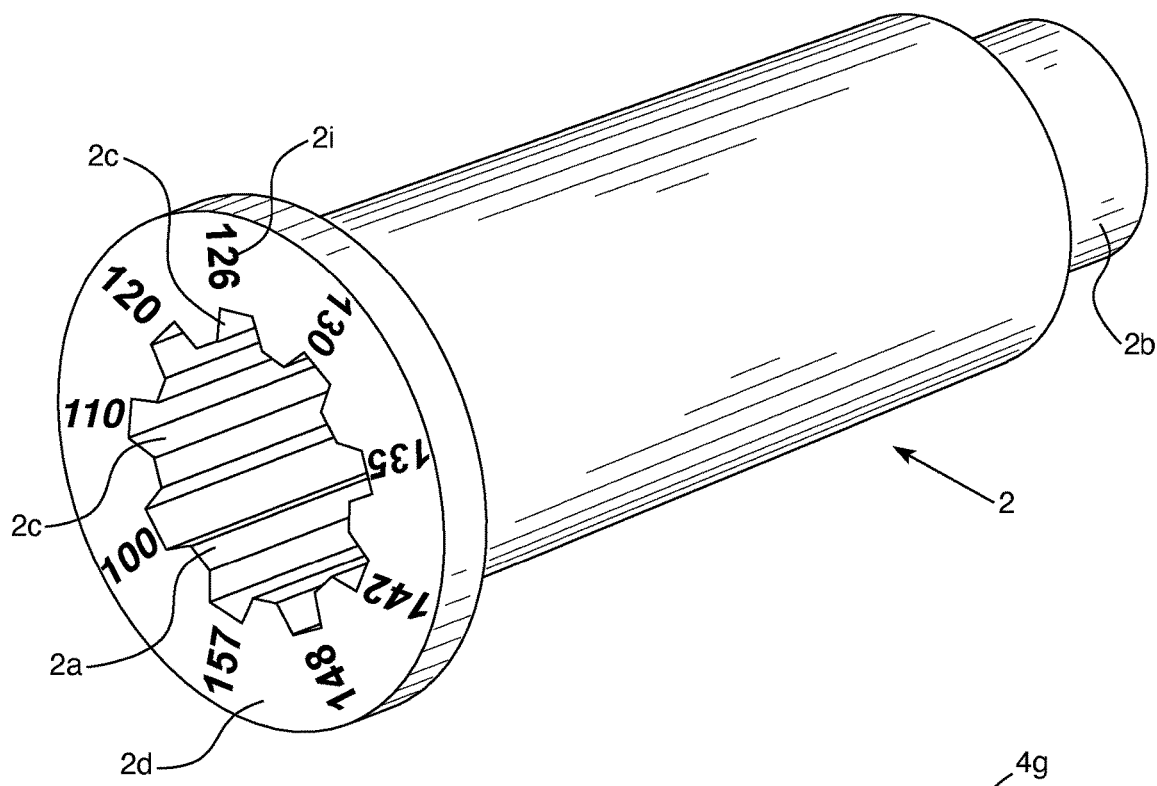
FIG. 3 is a perspective view of an outer member of the first exemplary embodiment of the bicycle transportation spacer.
Figure 4:
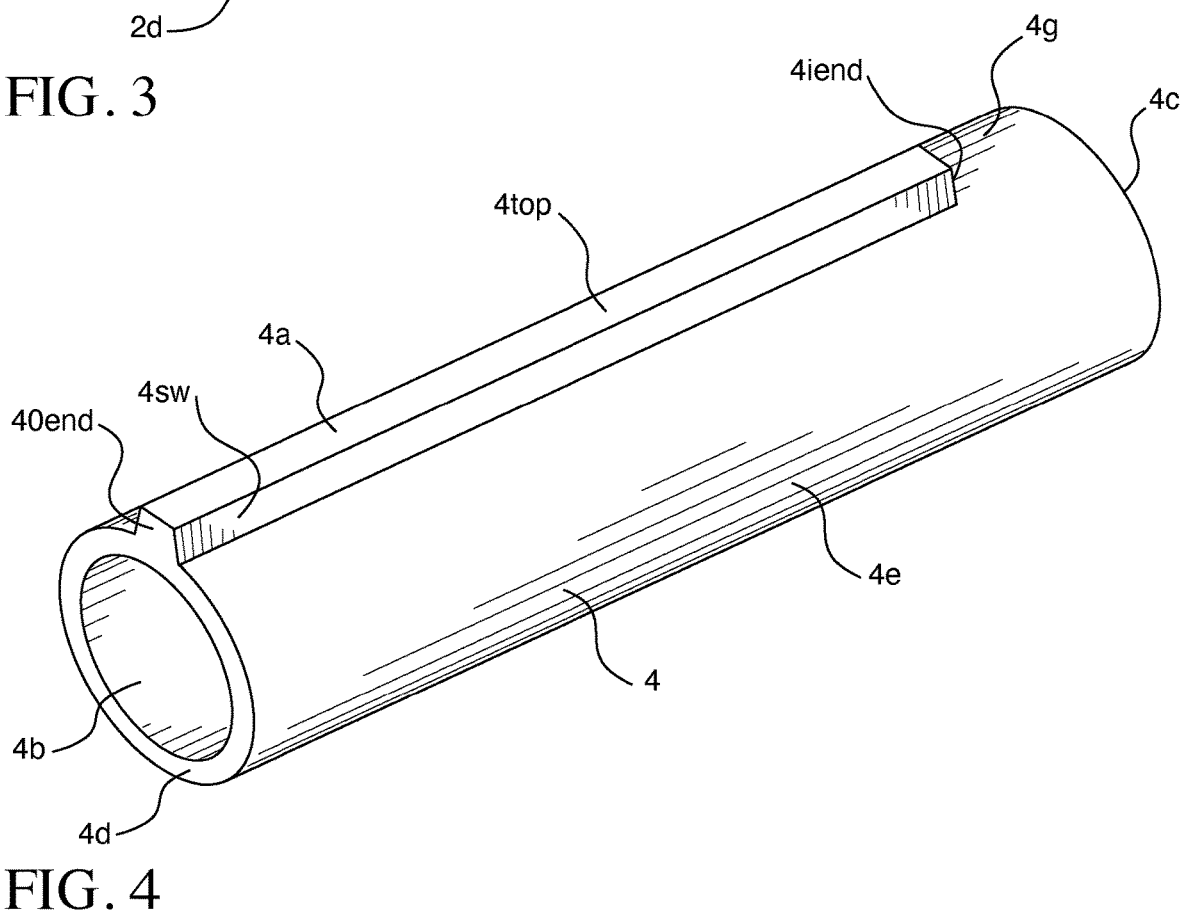
FIG. 4 is a perspective view of an adjustably extendible and retractable inner member of the first exemplary embodiment of the bicycle transportation spacer.

Referring to FIGS. 1-7, a bicycle transportation apparatus can include a spacer 1. The spacer 1 can include an outer body 2 that has an inner passageway 2a defined therein. The inner passageway 2a can extend from a second end 2d of the outer body 2 to a first end 2b of the outer body 2 or can extend from the second end 2d of the outer body 2 or to a location that is between the second end 2d of the outer body 2 and the first end of the outer body 2b (e.g. a location near a central portion or an intermediate portion of the outer body 2). The first end 2b can include a terminal portion that is shaped for insertion into a hole of a bike frame sized to receive an axle of a bicycle wheel (e.g. a hole of a front fork 11a or the hole of a rear seat stay 11b, etc.).

The spacer 1 can also include an adjustable member 4 that is adjustably insertable into the inner passageway 2a of the outer body 2. The adjustable member 4 can include a projection having a distal edge 4top and sidewalls 4sw extending from opposite sides of the distal top edge 4top to the body 4e of the adjustable member. The adjustable member 4 can extend from its first end 4c to its second end 4d. The adjustable member 4 can be a solid shaped member or be hollow and include an inner channel 4b (e.g. be tubular, pipe-like, or an annular polygonal member). The projection 4a can extend along a substantial portion of the length of the adjustable member 4 (e.g. more than 50% of the length of the adjustable member, more than 70% of the length of the adjustable member, more than 85% of the length of the adjustable member, etc.) or so that there is a gap 4g between the first end 4c of the adjustable member and an inner distal edge 4iend of the projection 4a that is opposite an outer peripheral edge 4oend of the projection 4a that is adjacent (e.g. at or near) the second end 4d of the annular member 4. The gap 4g can be sized to permit the first end 4c of the adjustable member to be insertable into a hole of a bike frame (e.g. hole at a distal portion of a front fork 11a or a rear stay through which a bicycle wheel axle is passable when a tire is attached to the bike frame).

The outer body 2 can also define multiple spaced part internal grooves 2c that are each in communication with the inner passageway 2a so a projection 4a extending from the body of an adjustable member 4 is insertable therein while the adjustable member 4 is positioned within the inner passageway 2a. Each groove 2c can be considered a channel, a furrow, or another type of groove that is in communication with the inner passageway. The projection 4a can be considered a spline, a protuberance, a rib, or other type of elongated projection. Each groove 2c can help guide movement of the adjustable member 4 within the outer body 2 when the adjustable member 4 is moved within the inner passageway and a projection 4a is within a groove 2c.

Each groove 2c can be sized and shaped to matingly receive the projection 4a that can extend from the adjustable member 4 so the adjustable member can be passed into and out of the inner passageway 2a to different positions to adjust a length of the spacer 1. Each groove 2c can have a different length to define different pre-selected lengths of the spacer between a longest length and a shortest length. The adjustable member 4 can be moveable into different grooves 2c to adjust an extent to which the adjustable member 4 extends from the outer body 2 to define a length of the spacer so that the spacer 1 is adjustable to different lengths.

The second end 2d of the outer body 2 can have a terminal opening of each groove 2c defined therein. Each groove 2c can also include a mouth, or interface, at which the groove 2c is in communication with the inner passageway 2a, which can be positioned more centrally within the outer body 2 than the grooves 2c (e.g. the spaced apparat grooves 2c can be arranged to extend along a periphery of the inner passageway at different locations along the periphery of the inner passageway).

The second end 2d of the outer body 2 can also include indicia 2i. Each indicia 2i can be positioned adjacent a respective terminal opening of a groove 2c to provide a visible indication of a size or length of the spacer 1 when the projection 4a of the adjustable member 4 is positioned within that groove 2c. Each groove 2c can have a unique length at which it extends from the second end 2d toward a terminal groove ending location defined between the second end 2d and the first end 2b of the outer body 2. Each indicia 2i can be positioned adjacent a respective terminal opening of a respective groove 2c adjacent the second end 2d to indicate the length the spacer can be when the projection 4a of the adjustable member 4 is within the entire length of that particular groove 2c.

For instance, a first groove 2c can have a first length, a second groove 2c can have a second length that is longer or shorter than the first length, the third groove 2c can have a third length that is longer or shorter than the first length and also longer or shorter than the second length. There can also be a fourth groove 2c that is (i) longer or shorter than the first length, (ii) longer or shorter than the second length, and (iii) longer or shorter than the third length. There can also be a fifth groove 2c that is (i) longer or shorter than the first length, (ii) longer or shorter than the second length, (iii) longer or shorter than the third length, and (iv) longer or shorter than the fourth length. There can also be a sixth groove 2c that is (i) longer or shorter than the first length, (ii) longer or shorter than the second length, (iii) longer or shorter than the third length, (iv) longer or shorter than the fourth length, and (v) longer or shorter than the fifth length. There can also be a seventh groove 2c that is (i) longer or shorter than the first length, (ii) longer or shorter than the second length, (iii) longer or shorter than the third length, (iv) longer or shorter than the fourth length, (v) longer or shorter than the fifth length, and (vi) longer or shorter than the sixth length. There can also be an eighth groove 2c that is (i) longer or shorter than the first length, (ii) longer or shorter than the second length, (iii) longer or shorter than the third length, (iv) longer or shorter than the fourth length, (v) longer or shorter than the fifth length, (vi) longer or shorter than the sixth length, and (vii) longer or shorter than the seventh length. There can also be a ninth groove 2c that is (i) longer or shorter than the first length, (ii) longer or shorter than the second length, (iii) longer or shorter than the third length, (iv) longer or shorter than the fourth length, (v) longer or shorter than the fifth length, (vi) longer or shorter than the sixth length, (vii) longer or shorter than the seventh length, and (viii) longer or shorter than the eighth length. Other embodiments can utilize less than nine grooves 4c or more than nine grooves 4c. There can be a respective indicia 2i for each groove located at the second end 2d of the outer body 2 to indicate the unique length of the spacer 1 that can be defined when the inner adjustable member 4 is within the inner passageway 2a and the projection 4a is within the groove 2c of that indicia 2i.

Each groove 2c can have a cross-sectional profile to matingly receive the projection 4a that can extend from the adjustable member 4. The groove's size and shape can be configured to provide an interference fit so that the adjustable member 4 is slideable within the inner passageway 2a when the projection 4a is within the groove 2c and a user applies a sufficient force to move the adjustable member 4 to overcome the friction induced from the sidewalls 4sw and distal terminal side 4top of the projection 4a contacting and moving along the portions of the outer body 2 that define the sides of the groove 2c as the adjustable member 4 is moved within the inner passageway 2a of the outer body 2.

In some embodiments, the cross-sectional shape of each groove 2c can be trapezoidal in shape (as may best be seen from FIG. 2) or can be another type of polygonal shape (e.g. triangular, pentagonal, hexagonal, octagonal, etc.). The cross-sectional profile of the projection 4a can have a similar polygonal profile as the cross-sectional shape of the groove 2c to provide a mateable fit within the groove 2c (e.g. the cross-sectional shape of the projection 4a can be triangular, trapezoidal, pentagonal, hexagonal, etc.).

The engagement between the projection 4a and the portions of the outer body 2 that define the sides of the groove 2c (e.g. contact between the sidewalls 4sw and terminal side 4top and sides of groove 2c defined by portions of the outer body 2) can be sufficient to prevent the adjustable member 4 from freely moving in and out of the inner passageway when the projection 4a is within the groove 2c or within an entire length of the groove 2c. Such an interference fit between the projection 4a and groove 2c of the outer body 2 can prevent the spacer 1 from changing in length after it is coupled to a frame of a bicycle.

Once the adjustable member 4 is secured to a particular position, a user may need to apply a force on the adjustable member 4 by use of a hand or tool to remove the adjustable member 4 from the outer body 2 for repositioning of the adjustable member 4 into a different groove 2c. For example, a user may need to insert a screw driver or nail into the inner passageway 2a for contacting an end of the adjustable member 4 while the outer body 2 is held within a clamp or securely grasped by a user's hand. The user can then use a hammer to hit the screwdriver or nail to provide a force to dislodge the adjustable member 4 from the outer body 2 after the adjustable member 4 is positioned within the inner passageway and the projection 4a is within an entire length of a groove 2c. As another example, a user may grasp an exposed portion of the moveable member 4 with one hand and grasp the outer body 2 with another hand and then provide a force to move those components away from each other with a sufficient force to slide the adjustable member 4 out of the inner passageway so the projection 4a is entirely out of a groove 2c so that the adjustable member 4 can be positioned into a different groove 2c for defining a different length for the spacer 1.

Once the adjustable member 4 is removed from the outer body 2, the adjustable member 4 can be positioned to extend a different distance out of the outer body 2 by having its projection 4a inserted into a different groove 2c and being slid within the outer body 2 until the projection 4a is within an entire length of the groove 2c. If desired, a hammer can be used to hit the distal end of the adjustable member 4 to help move the adjustable member 4 within the outer body to the desired position.

It should be appreciated that the adjustable member 4 can be removed from the outer body 2 and subsequently moved into different grooves 2c for being at different positions for defining different lengths of the spacer 1 numerous times as may be needed for a particular shipping situation or to adjust the size of the spacer 1 to account for a particular bicycle frame dimension.

Figure 5:
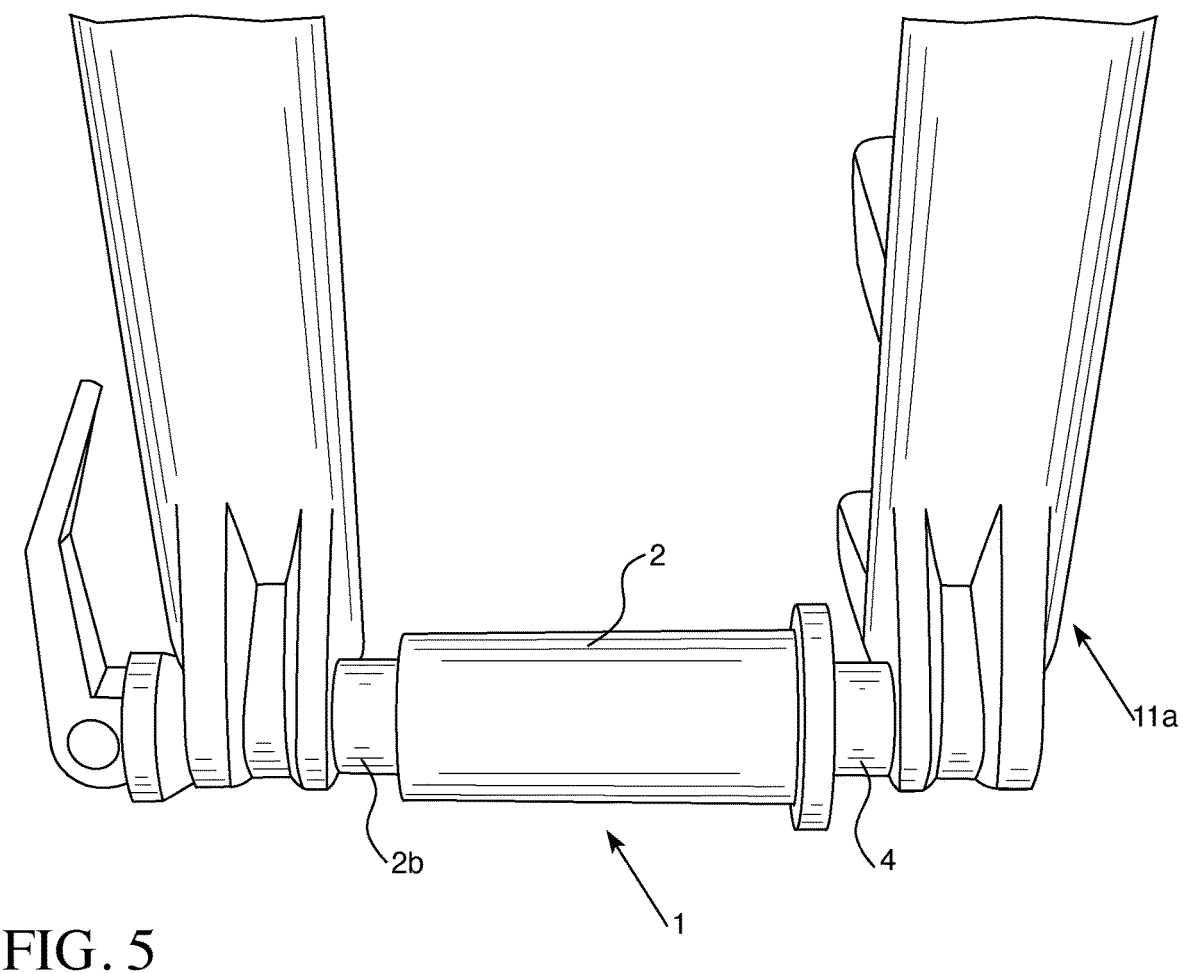
FIG. 5 is a perspective view of the first exemplary embodiment of the bicycle transportation spacer mounted between the front forks of a bike frame.
Figure 6:
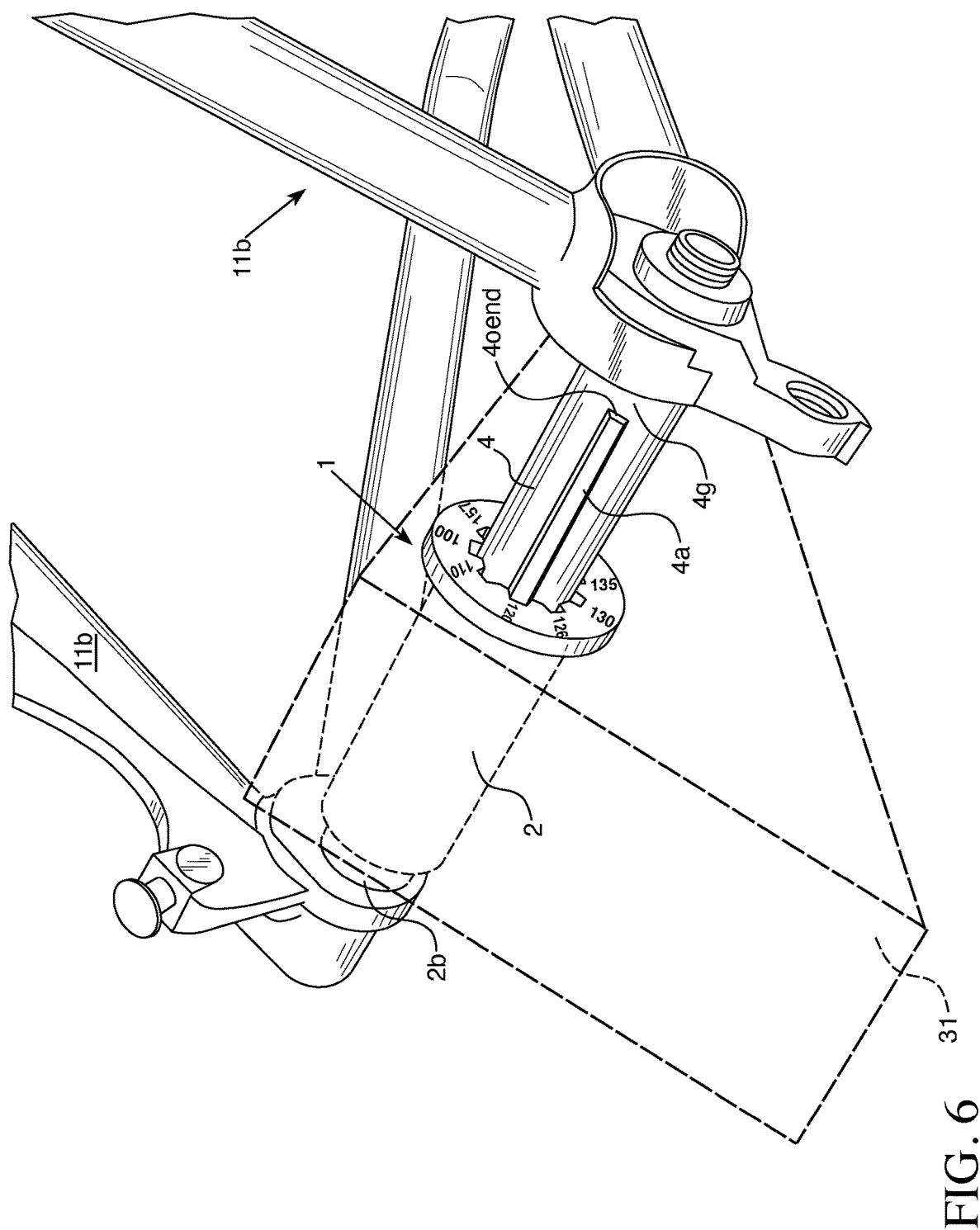
FIG. 6 is a perspective view of the first exemplary embodiment of the bicycle transportation spacer mounted between the rear seat stays of a bike frame.
Figure 7:
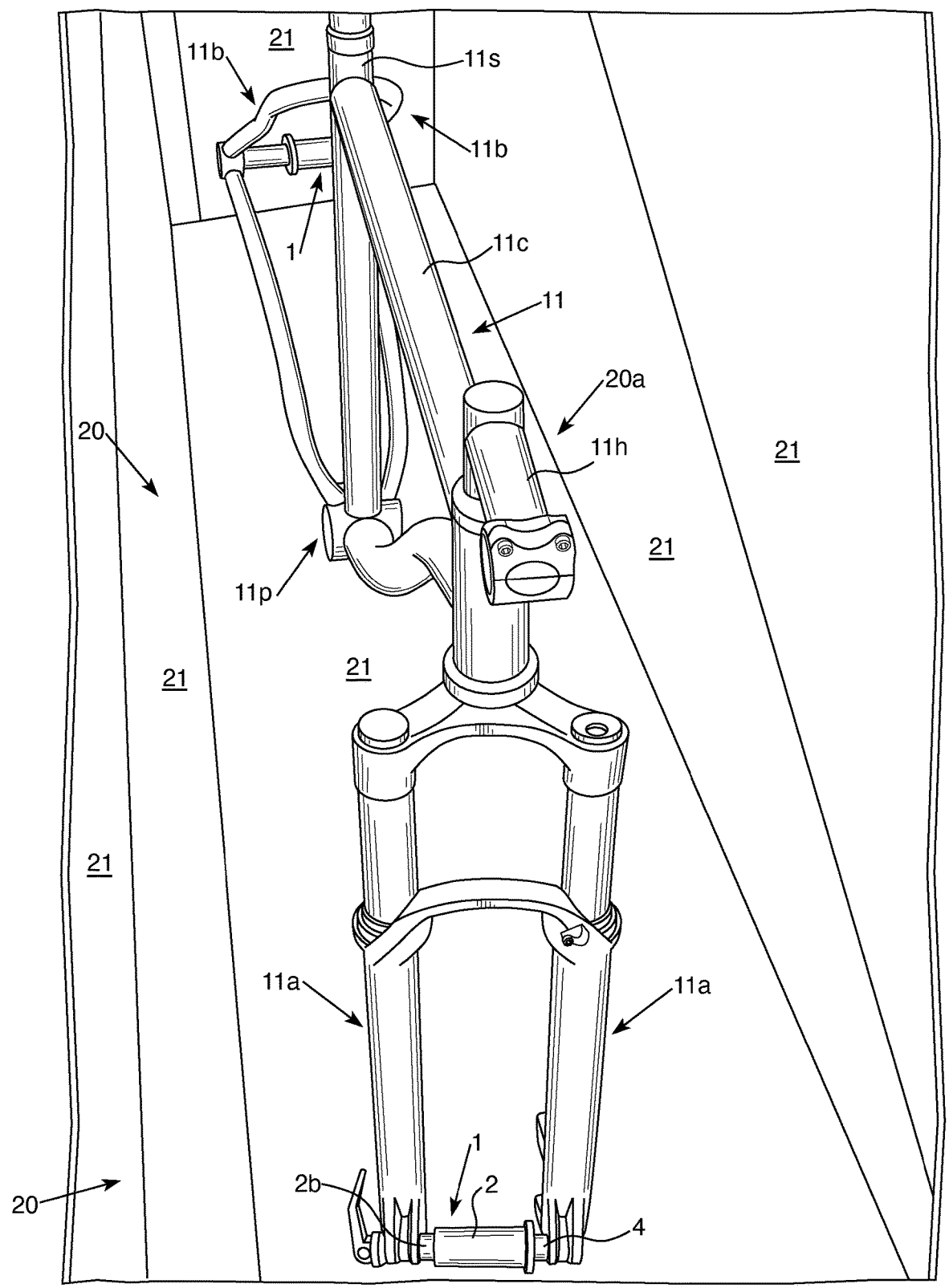
FIG. 7 is a perspective view of a bicycle within an open box for package and transportation that illustrates multiple first exemplary embodiments of the bicycle transportation spacer with a rear spacer mounted between the rear seat stays of a bike frame within the box and a front spacer mounted between the front forks of the bike frame within the box.

FIGS. 5-7 illustrate exemplary ways in which the spacer 1 can be positioned for attachment to a frame 11 of a bicycle. For example, a front spacer 1 can be positioned between the front forks 2a of a frame to position the spacer 1 where the front wheel axle would be retained between the front forks 2a. The positioning of the spacer 1 can help improve the rigidity of the frame by maintaining the spacing of the front forks 11a of the frame 11 and preventing the forks 11a from bending or fracturing in the event the box 20 in which the frame 11 is shipped is dropped or a heavy object falls on the box or other container.

In this position, the spacer 1 can be located below an upper portion 11h of the bike frame 11 (e.g. a stem portion of the frame 11) at which handlebars may be attached to the frame 11. The position of the front spacer 1 can also be forward of the upper tube 11c that extends between the front forks 11a and rear seat stays 11b. The front spacer 1 can also be positioned forward of the chain stays can also extend from a lower distal portion of the seat stays to a lower middle portion 11p of the frame at which pedals, crank arms, chain, and gear assembly can be connected to the frame 11. The front spacer 1 can also be forward of the portion 11s of the frame 11 that can be coupled to the seat can be located between the seat stays 11b and the upper tube 11c.

A rear spacer 1 can be positioned between the rear distal ends of the rear seat stays 11b between holes at which the rear axle of the rear wheel is retainable. These holes can also be defined in the rear ends of the chain stays. The rear spacer 1 can be located in a position that is rearward of the seat, stem, and forks 11a of the frame 11. The rear spacer 1 can also be rearward of the chain stays and upper tube 11c of the frame.

The rear spacer 1 can be connected between the rear terminal distal ends of the rear seat stays and/or rear ends of the spaced apart chain stays to help maintain the spacing between the seat stays 11b and/or chain stays and improve the rigidity of the frame 11 to avoid bending or fracture of the seat stays 11b and/or chain stays. The rear spacer 1 can be adjusted to be a length that differs form a length of the front spacer 1 to account for the different spacing that may exist between the spaced apart rear seat stays and the spaced apart front forks 11a. The adjustment in length can be performed as noted above (e.g. dislodgement of the inner adjustable member 4 for subsequent insertion of the projection 4a into a suitable groove 2c corresponding to the appropriate length of the spacer 1 that may be desired for the particular spacing between stays or forks and subsequent motion of the adjustable member 4 into the outer body 2 to the desired length via sliding of the projection 4a within the groove 2c and member 4 within inner passageway 2a of outer body 2.

Referring to FIG. 7, after the rear and front spacers 1 are coupled to the frame 11 (e.g. rear facer attached between rear seat stays 11b and/or chain stays and front spacer attached between front forks 11a), the bike frame 11 having the spacers 1 attached thereto can be positioned in a box 20. The box 20 can be a cardboard box or may be another type of container (e.g. a hard polymeric container, a container having a hinged lid, etc.). The box 20 can have multiple sides 21 that define an inner cavity 20a in which the frame 11 having the spacers 1 attached thereto is positionable. The frame 11 can be positioned in the cavity defined by the sidewalls 21 of the box along with other component parts of the bicycle. These parts can also be wrapped in paper, polymeric material (e.g. bubble wrap) or other wrapping. Filler (e.g. styrofoam peanuts, corrugated paper, etc.) can also be positioned in the box's cavity to help limit movement of the different components positioned in the box 20. The box 20 can then be closed and sealed for shipment. Some sides 21 of the box 20 can be taped together at different seams to help keep the box 20 closed during shipment.

A delivery service can then transport the enclosed box 20 having the frame 11 and spacers 1 and other bicycle components for transportation to a destination. These other components can include, for example, wheels, handlebars, at least one seat, a helmet, peddles, crank shafts, gears, brakes, and a chain. This transportation can include the box 20 being passed through multiple different warehouses having different types of conveyance systems and shelving. Each warehouse may utilize a forklift or other device for retaining the box 20 on a shelf or other storage location while the box is in transit to its destination. The box can also be placed on a plane or boat for the shipment to its destination during transit. After the box is delivered at its destination, the box can be opened by the recipient of the shipment. The recipient can then open the box, unwrap the frame 11 and other components, remove the spacers 1, and then use the components in the box 20 to re-assemble the bicycle for subsequent use.

The spacers 1 can help provide an improvement in rigidity to the frame 11 during transit of the box 20 to help avoid damage or severe damage to the frame. For example, undesired bending or fracture of the front forks, rear seat stays or chain stays can be avoided by the improved rigidity of the frame that is provided by use of the spacers 1.

The outer body 2 and the inner adjustable member 4 can each be composed of a polymeric material, a metal or a composite material. The adjustable member 4 can be a tubular shaped member or an annular shaped member (e.g. annular shaped elongated member having a rectangular or hexagonal cross-sectional profile, etc.) to help reduce the weight of the spacer 1. In other embodiments, the adjustable member 4 can be solid and not be an annular shaped structure. In yet other embodiments, the adjustable member 4 can be a hollow member or include hollowed sections to help reduce the weight of the member without it being a fully annular shape (e.g. tubular in shape, etc.).

In some embodiments, the apparatus can also include mounting devices 31 that are positionable within the box 20. For example, there can be front and rear mounting devices 31 that can be attached to the bottom of a box 20 (e.g. glued, taped, fastened, etc.) or can be positionable on the bottom of the box 20. The mounting devices 31 can be comprised of foam or other type of lightweight material and have a polygonal shape, a generally triangular or triangular pyramid type shape, or other shape so that a bottom base of the mounting device can be on the bottom of the box 20 and an upper portion of the mounting device body can be positioned to retain a spacer attached to a bike frame. In some embodiments, the top portion or upper portion of the mounting device body can have a mounting channel extending between holes defined in opposite sides of the body of the mounting device (e.g. a channel extending between holes define in the left and right sides of the body of the mounting device, a channel extending between holes defined in the front and rear sides of the body of the mounting device). FIG. 6 illustrates and example of such a mounting device 31 in broken line.

As may best be seen from FIG. 6, the outer body 2 can be sized and configured to be passed into the channel for being retained in the channel of the body of the mounting device 31. An end of the outer body 2 can be positioned outside of the channel for being positioned in a portion of a bike frame (e.g. the first end of the outer body can extend from a first side of the mounting device between the top and bottom of the mounting device 31 while the outer body 2 is within the channel of the mounting device 31). The adjustable member 4 can also be positionable within the outer body 2 while it is within the channel and can be positioned to extend from the opposite side of the body of the mounting device for attachment to another portion of the bike frame (e.g. the second end of the outer body can be positioned on the second side of the mounting device that is opposite its first side and be positioned between the top and bottom of the mounting device 31 and the adjustable member 4 can extend from the second side of the mounting device 31 while the outer body 2 is positioned within the channel of the mounting device 31). The spacer 1 can be positionable within the channel defined in the body of the mounting device 31 to position the spacer above a floor of the cavity of the box 20 and support the bike frame within the box in a desired position. In such a configuration, the body of the mounting device 31 can help provide additional support and protection to the bike frame.

In other embodiments, the mounting opening of a mounting device 31 can be a mounting groove, furrow, or other upper mounting opening defined in a top portion of the body of the mounting device that is sized and configured to receive the body of the spacer (e.g. outer body 2 and/or adjustable member 4) to retain the spacer 1 in that upper mounting opening for positioning of the bicycle frame in the box 20 for transport of the bicycle within the box 20. In such embodiments, the mounting opening may be defined by the top surface or upper surface of the body of the mounting device 31.

Each mounting body of a mounting device 31 can be shaped to be an integral sized body having the upper mounting opening or channel defined therein for positioning in the box 20 so that at least front and rear mounting devices are positionable within the box 20. Each mounting device can have a body composed of and/or molded of foam or a polymeric material that has the pre-defined shape having the upper mounting opening, for example. The pre-defined shape of the body can be triangular, rectangular, square, or other type of suitable shape.

It should be appreciated that modifications to the embodiments explicitly shown and discussed herein can be made to meet a particular set of design objectives or a particular set of design criteria. For instance, the material composition for the different structural components of the apparatus can be any type of suitable materials as may be needed to meet a particular set of design criteria. For instance, in some embodiments the inner and outer bodies of the spacer 1 can be composed of a polymeric material, a metal, or a composite material. As another example, it is contemplated that the inner body of the spacer 1 can define grooves or projections and an outer member can be slideably positionable relative to the inner component. The outer adjustable member can have a projection for being mateably positioned within different grooves or have a groove for being mateably positionable within different projections to provide an alternative adjustable spacer 1 in which the outer member is slideable or adjustable relative to the inner body to define adjustable lengths of the spacer 1.

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a bicycle transportation spacer, bicycle transportation apparatus, and methods of making and using the same have been shown and described above, it is to be distinctly understood that the invention is not limited thereto but may be otherwise variously embodied and practiced within the scope of the following claims

What is claimed is:

1. A bicycle transportation apparatus, comprising:
   a spacer, the spacer having an outer body and an adjustable member that is positionable within an inner passageway of the outer body to different locations so a length of the spacer is adjustable;
   the spacer being positionable for attachment to a bike frame of a bicycle;
   wherein the adjustable member has a projection and the outer body has a plurality of grooves positioned adjacent the inner passageway, each of the grooves being in communication with the inner passageway;
   the projection sized and configured to be matingly received within any of the grooves while a portion of the adjustable member is within the inner passageway; and
   wherein each of the grooves has a different length to define different positions for the adjustable member for defining different lengths of the spacer.

2. The bicycle transportation apparatus of claim 1, wherein each of the grooves is sized so that the adjustable member is in a selectable pre-defined position within the outer body when the projection is positioned within an entire length of the groove.

3. The bicycle transportation apparatus of claim 1, wherein the outer body has a first end and a second end, each of the grooves extending into the outer body from the second end; and
   wherein the inner passageway extends from the second end of the outer body to the first end of the outer body or to a position that is between the first end of the outer body and the second end of the outer body.

4. The bicycle transportation apparatus of claim 3, wherein each of the grooves has a terminal opening defined in the second end of the outer body.

5. The bicycle transportation apparatus of claim 4, comprising indicia, each of the indicia positioned on the second end of the outer body adjacent to a respective one of the terminal openings of the grooves.

6. The bicycle transportation apparatus of claim 1, comprising:
   the bike frame, the bike frame having spaced apart front forks, the spacer being attached between the front forks.

7. A bicycle transportation apparatus, comprising:
   a spacer, the spacer having an outer body and an adjustable member that is positionable within an inner passageway of the outer body to different locations so a length of the spacer is adjustable;
   the spacer being positionable for attachment to a bike frame of a bicycle; and
   the bike frame, the bike frame having spaced apart seat stays and/or chain stays, the spacer being attached between the seat stays and/or chain stays.

8. The bicycle transportation apparatus of claim 7, wherein the outer body is comprised of a polymeric material and the adjustable member is comprised of a polymeric material.

9. A bicycle transportation apparatus, comprising:
   a spacer, the spacer having an outer body and an adjustable member that is positionable within an inner passageway of the outer body to different locations so a length of the spacer is adjustable;
   the spacer being positionable for attachment to a bike frame of a bicycle;
   wherein the spacer is a front spacer, the bicycle transportation apparatus also comprises:
   the bike frame, the bike frame having spaced apart front forks and spaced apart seat stays and/or chain stays, the front spacer attached to the bike frame between the front forks;
   a rear spacer, the rear spacer having an outer body and an adjustable member that is positionable within an inner passageway of the outer body to different locations so a length of the rear spacer is adjustable from a first length to at least one second length, the rear spacer attached between the seat stays and/or chain stays.

10. The bicycle transportation apparatus of claim 9, comprising:
    a box, the bike frame positionable within the box.

11. A bicycle transportation spacer comprising:
    an outer body having a first end and a second end opposite the first end, the outer body having an inner passageway that extends from the second end and a plurality of spaced grooves positioned around the inner passageway, each of the grooves being in communication with the inner passageway;
    an adjustable member that is positionable within the inner passageway of the outer body to different locations so a length of the spacer is adjustable, the adjustable member having a projection sized and configured to be matingly received within any of the grooves while a portion of the adjustable member is within the inner passageway; and wherein each of the grooves has a different length to define different positions for the adjustable member to define different lengths of the spacer.

12. The bicycle transportation spacer of claim 11, wherein each of the grooves is sized so that the adjustable member is in a selectable pre-defined position within the outer body when the projection is positioned within an entire length of the groove to define a length of the spacer for attachment to a frame of a bicycle.

13. A bicycle transportation spacer comprising:
an outer body having a first end and a second end opposite the first end, the outer body having an inner passageway that extends from the second end and a plurality of spaced grooves positioned around the inner passageway, each of the grooves being in communication with the inner passageway;
an adjustable member that is positionable within the inner passageway of the outer body to different locations so a length of the spacer is adjustable, the adjustable member having a projection sized and configured to be matingly received within any of the grooves while a portion of the adjustable member is within the inner passageway;
wherein:
the inner passageway extends from the second end of the outer body to the first end of the outer body or to a position that is between the first end of the outer body and the second end of the outer body;
each of the grooves has a terminal opening defined in the second end of the outer body;
the projection is a spline; and
the adjustable member is a tubular member or an annular member.

14. A method of transporting a bicycle, comprising:
providing at least one spacer for attachment to a frame of a bicycle, the spacer having an outer body and an adjustable member that is positionable within an inner passageway of the outer body to different locations so a length of the spacer is adjustable;
attaching the at least one spacer to the frame; and
positioning the frame having the at least one spacer attached thereto in a box for shipment of the bicycle;
adjusting a length of the at least one spacer via movement of the adjustable member to a pre-selected location within the inner passageway before attaching the at least one spacer to the frame;
positioning a projection of the adjustable member within a groove of the outer body and sliding the adjustable member within the inner passageway until the projection is within an entire length of the groove, the groove being in communication with the inner passageway; and
wherein the projection is a spline, the adjustable member is a tubular member or an annular member, the adjustable member is comprised of a polymeric material and the outer body is comprised of a polymeric material.

* * * * *